United States Patent [19]

Morishita et al.

[11] Patent Number: 4,899,393

[45] Date of Patent: Feb. 6, 1990

[54] METHOD FOR IMAGE REGISTRATION

[75] Inventors: Koichi Morishita, Kawasaki; Tetsuo Yokoyama, Tokyo; Kazuhiro Sato, Kitasoma, all of Japan

[73] Assignees: Hitachi, Ltd.; Hitachi Medical Corporation, both of Tokyo, Japan

[21] Appl. No.: 13,072

[22] Filed: Feb. 10, 1987

[30] Foreign Application Priority Data

Feb. 12, 1986 [JP] Japan .................................. 61-26705

[51] Int. Cl.$^4$ .................................................. G06K 9/00
[52] U.S. Cl. ....................................... 382/6; 358/111; 364/413.14; 382/54
[58] Field of Search ....................... 382/6, 54; 364/414, 364/413.14, 413.15, 413.17; 358/111

[56] References Cited

U.S. PATENT DOCUMENTS

| | | | |
|---|---|---|---|
| 3,905,045 | 9/1975 | Nickel | 382/6 |
| 3,999,047 | 12/1976 | Green | 382/6 |
| 4,217,641 | 8/1980 | Naparstek | 382/6 |
| 4,315,318 | 2/1982 | Kato et al. | 382/6 |
| 4,504,908 | 3/1985 | Riederer et al. | 358/111 |
| 4,542,459 | 9/1985 | Riederer | 364/414 |
| 4,635,293 | 1/1987 | Watanabe | 382/44 |
| 4,636,953 | 1/1987 | Kageyama | 364/414 |
| 4,641,352 | 2/1987 | Fenster et al. | 382/6 |
| 4,644,582 | 2/1987 | Morishita et al. | 382/6 |
| 4,707,786 | 11/1987 | Dehner | 382/6 |

Primary Examiner—Leo H. Boudreau
Attorney, Agent, or Firm—Antonelli, Terry & Wands

[57] ABSTRACT

In order to extract correctly an intended region by correcting the distortion of two images due to different time points of observation, an emphasis factor which depends on the standard deviation of the image gray value within the intended region is evaluated, and the intended region for registration is selected after adaptive filtering with characteristics determined by the emphasis factor.

3 Claims, 6 Drawing Sheets

F I G. 2
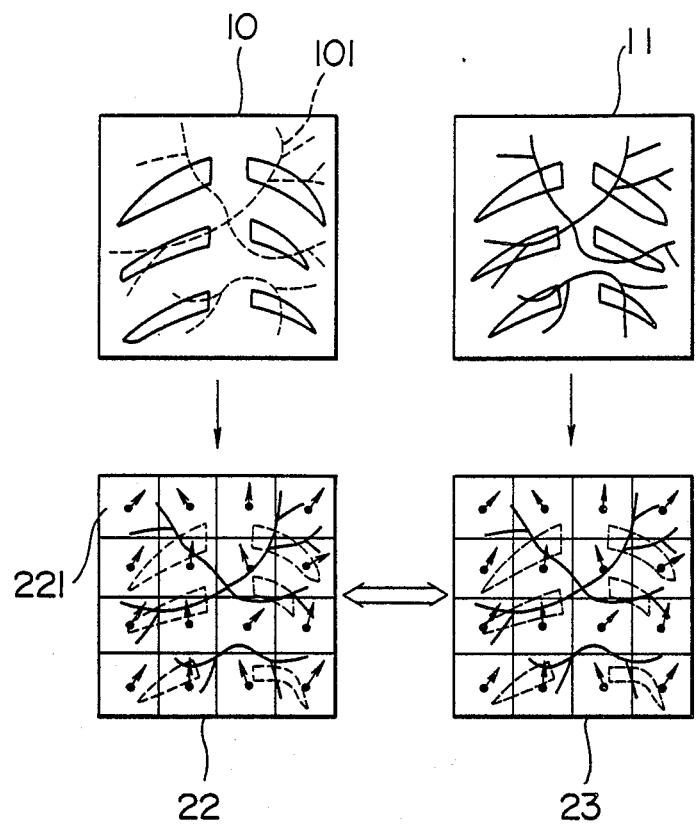

METHOD FOR IMAGE REGISTRATION

BACKGROUND OF THE INVENTION

This invention relates to a method of image registration, including matching, editing and comparison by recognition of images, and more particularly to a method of registration between selected partial images for the digital subtraction method which extracts radiopaque portions such as vessels through subtraction between radiographs before and after the infusion of contrast medium.

An article entitled "Study of Automatic Registration Method in Digital Subtraction Angiography", by Watanabe et al., Proceeding of 1984 Annual Meeting of The Institute of Electronic and Communication Engineers of Japan, 1292, pp. 5-64, describes automatic registration between a mask image and a live image using a computer. However, this method is solely intended to detect the global movement of the whole image, and the article does not deal with elective registration, such as for the erasure of artifacts produced by the movement of bones, or registration for small vessels.

SUMMARY OF THE INVENTION

An object of this invention is to provide a registration method which distinguishes the movement of an image region based on the fact radiograph is a projection image, and selects a specific region by a filtering preprocess.

In a projection image including a radiographic image, a 3-dimensional object is projected onto a 2-dimensional plane, and therefore various portions are imaged integrally in one photograph. On this account, regions of different movement need to be processed separately when registering images.

A particular matter in angiography is the difference in movement of bones and vessels. Namely, the former exhibits a global movement, while the latter exhibits a local movement. The present invention is intended to solve this problem by emphasizing subject portions through a filtering preprocess prior to registration.

BRIEF DESCRIPTION OF THE DRAWINGS

FIGS. 1 and 2 are diagrams showing the processes according to this invention;

DESCRIPTION OF THE PREFERRED EMBODIMENT

Figure 4:
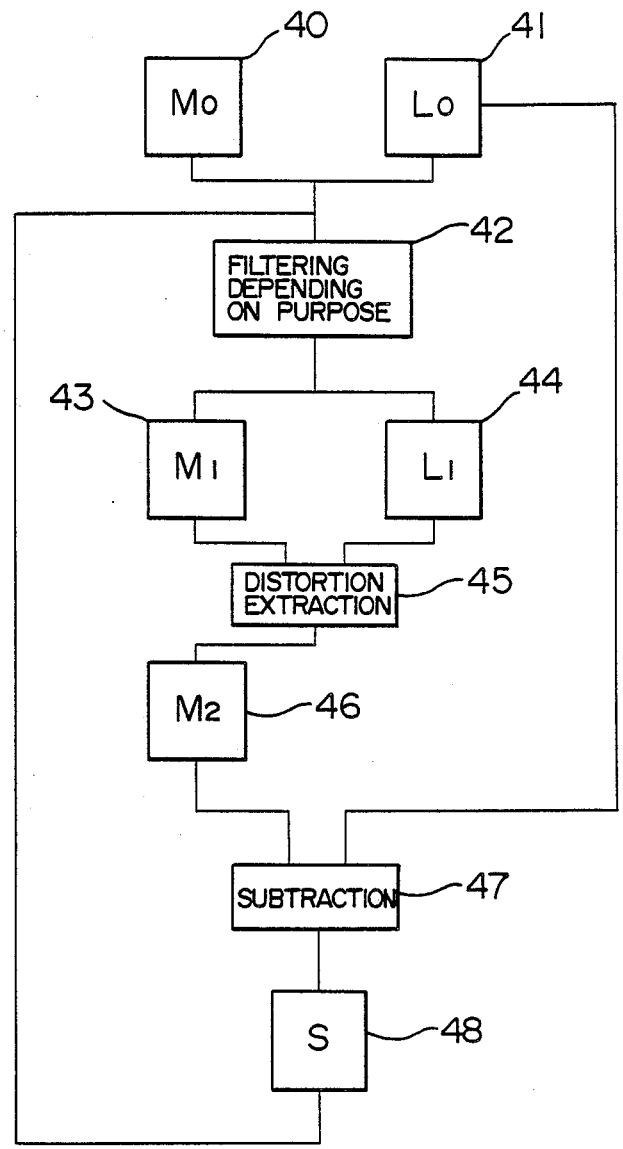
FIG. 4 is a flowchart showing the sequence of the image registration process according to this invention.
Figure 5:
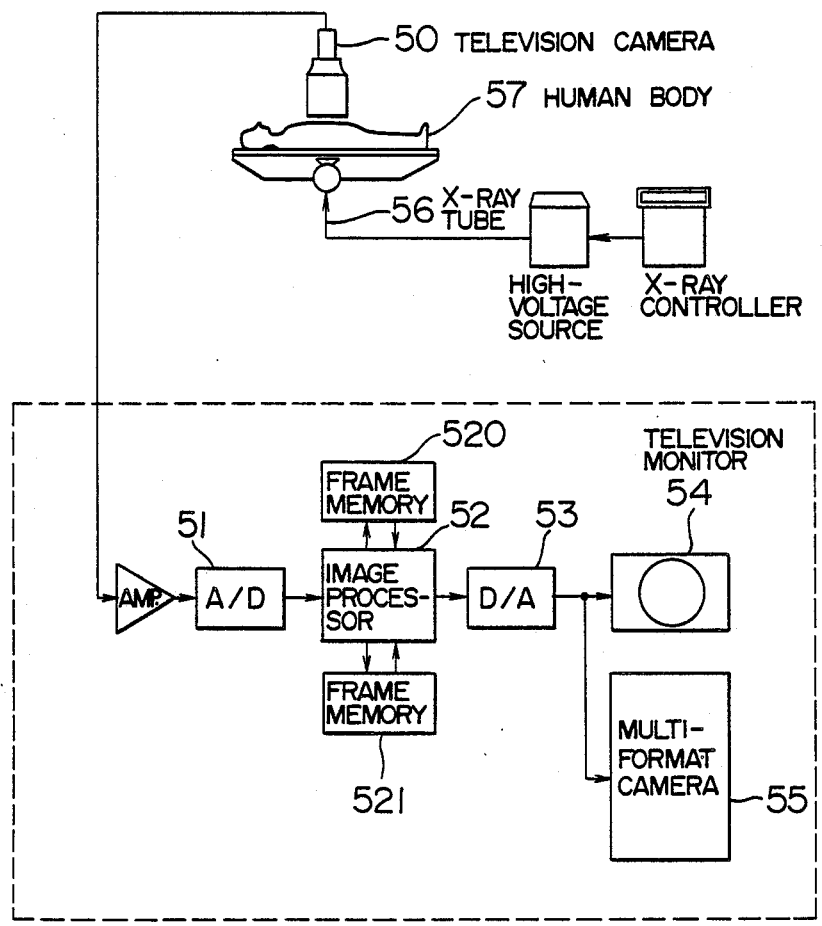
FIG. 5 is a block diagram of the medical image processing system to which this invention is applied.

In FIG. 5 showing a medical image processing system, to which this invention is applied, an X-ray produced by an X-ray tube 56 transmits X-rays through a human body 57, and the X-ray image is transformed into an electrical signal by a television camera 50, quantized by an A/D converter 51 and received by an image processor 52. The image processor 52 implements a subtraction processing between images stored in frame memories 520 and 521, and the result is fed through a D/A converter 53 to a television monitor 54 or multi-format camera 55. The inventive registration process shown in FIG. 4 is executed by the image processor 52.

Figure 1:
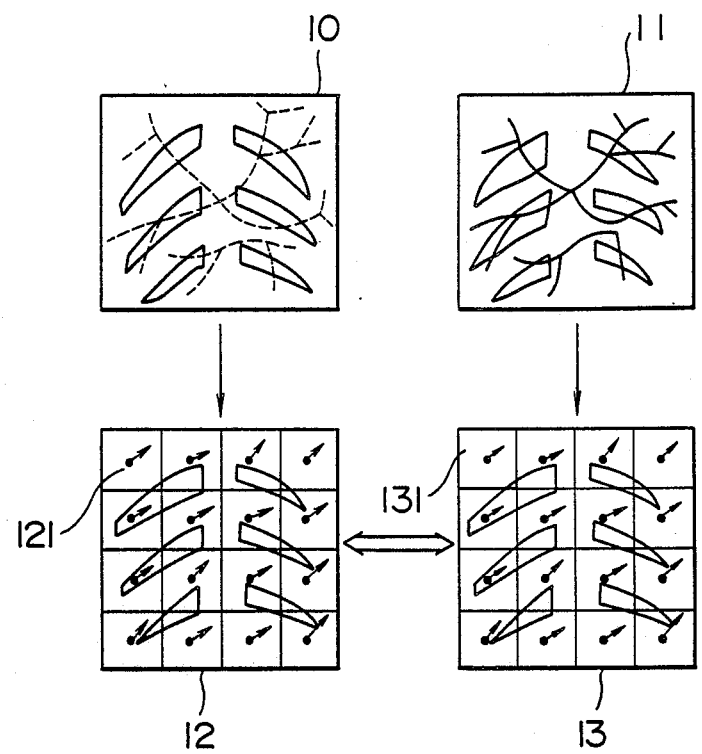

FIG. 1 shows a mask image 10 and live image 11 of the human chest under the registration process. Since the mask image 10 has been produced before infusing contrast medium, it virtually does not exhibit vessels, but clearly exhibits bones. The live image 11, which is produced after contrast medium infusion, exhibits some vessels. Because of different time points at which the mask image 10 and live image 11 were produced, a distortion generally occurs between these images due to the movement of the body.

The mask image 10 and live image 11 are subjected to the adaptive filtering process, as will be described later, so that images 12 and 13 with an emphasis being put on the edge of bones are produced. By a method such as template matching for each pair of partial images 121 and 131 in the emphasized images 12 and 13, 2-dimensional distortion vectors 121 at arbitrary pixels in both images are produced, and the distortion of images mainly caused by the movement of bones can be detected.

FIG. 2 shows the detection of distortion vectors 221 mainly for vessels between the images through the filtering process which emphasizes a low-contrast portion, e.g., vessels, 101 to produce an emphasized image 22.

Figure 3A:
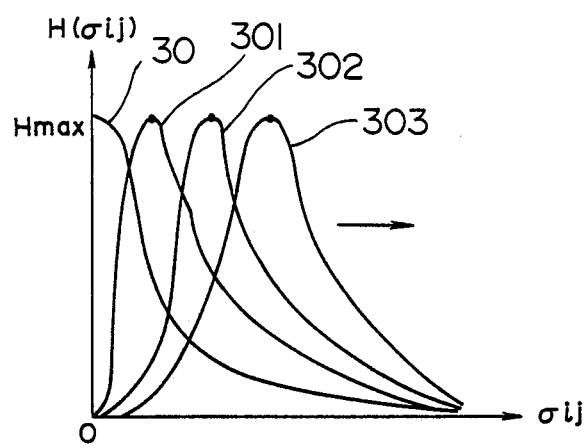
FIGS. 3A and 3B are graphs showing the characteristics of the adaptive filter used in this invention.
Figure 3B:
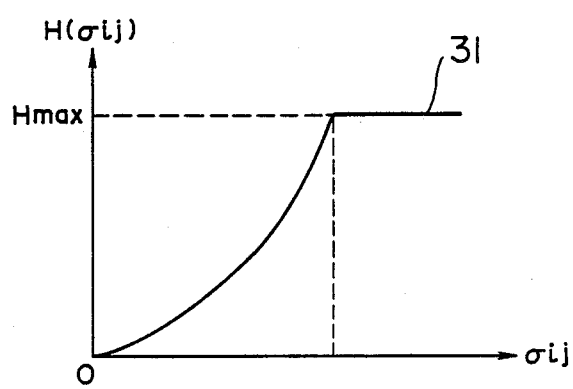

The characteristics of the above-mentioned adaptive filter will be described using FIGS. 3A and 3B. With the input image Xij, output image X'ij, average image $\bar{X}ij$ and standard deviation $\sigma ij$ of the input image, and function type factor (will be termed "emphasis factor") $H(\sigma ij)$, the filter characteristics are determined by the $H(\sigma ij)$ as follows.

$$X'ij = H(\sigma ij)(Xij - \bar{X}ij) + \bar{X}ij$$

The standard deviation $\sigma ij$ is large at edge sections and at a region of large variation of gray value, and is small at a region of small variation of gray value (flat region). Using such characteristics, the edge section of bones is emphasized by providing a monotone increasing function 31 of $\sigma ij$ as shown in FIG. 3B. For emphasizing flat regions such as vessels, a monotone decreasing function 30 of $\sigma ij$ is given (FIG. 3A). In the case where $\sigma ij$ of the subject region can be measured in advance because the subject region is known, any of the functions 301-303 which best emphasizes the subject region, as shown in FIG. 3A, can be selected.

FIG. 4 shows in flowchart and block form the sequence of process steps of the method.

Figure 6:
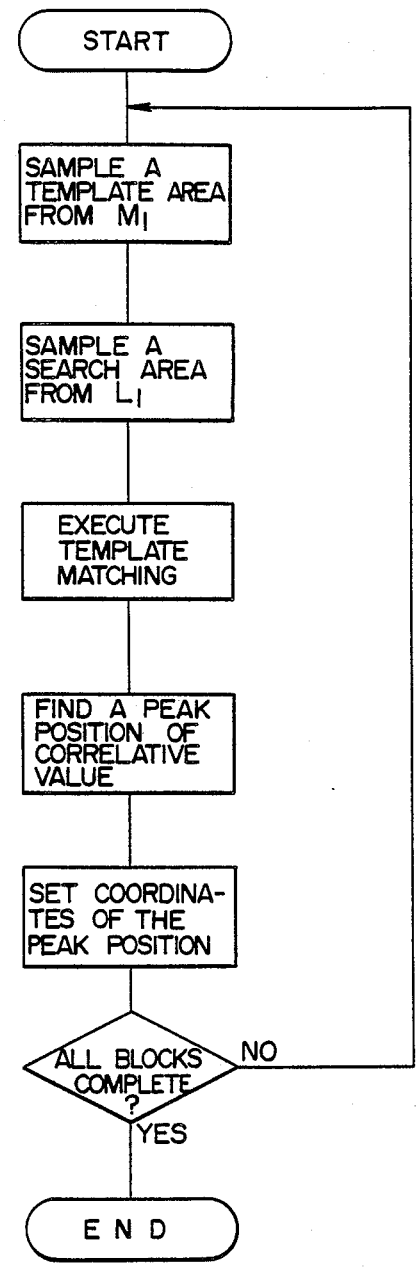
FIG. 6 is a flowchart showing the sequence of a distoration extraction process in step 45 in FIG. 4.

For original mask and live images 40 and 41, the operator (e.g., doctor) selectively executes filtering depending on the purpose of diagnosis (step 42). For example, when it is intended to remove the articraft caused by the distortion of bones between the images, the monotone increasing function 31 shown in FIG. 3B is used. After extracting distortion in accordance with the flowchart of FIG. 6 by a method such as template matching using the filtered images 43 and 44 (step 45), the mask image 40 is translated based on the distortion (step 46). Thereafter, the subtraction process is implemented between the mask and live images (step 47), and a subtraction image 48 is produced. If the operator is not satisfied with the image 48, the process is returned to step 42 to change the filtering characteristics.

The inventive method puts emphasis on a specific region of the image so as to detect local movement of the region for registration, providing a subtraction image for each purpose such as removal of bones or clarification of vessels, whereby images useful for diagnosis can be produced.

Although the foregoing embodiment of the invention relates X-ray subtraction angiography in the medical field, this invention can also be applied to the extraction of a change detection in satellite photograph images. Besides the subtraction process between images taken in different time points, the inventive method can also be used for the case of difficult registration due to a low contrast of image, for example, by filtering which emphasizes flat regions as mentioned above so as to improve the accuracy of detection.

We claim:

1. A method for image registration comprising the steps of:

taking first and second images of a certain region of a test object under different conditions;

adaptively selecting high frequency component emphasis coefficients corresponding to the image gray value of a desired portion to be registered in said certain region;

performing a high frequency emphasis filtering processing for the entire region of said first and second images using the adaptively selected emphasis coefficient;

defining a desired portion of said first and second images after the filtering processing; and performing image registration between the images of the defined desired portion.

2. A method for image registration according to claim 1, wherein said step of selecting high frequency component emphasis coefficients comprises changing the emphasis coefficients in accordance with the standard deviations of the gray values of the images at the desired portions.

3. A method for image registration according to claim 1, wherein said step of selecting high frequency component emphasis coefficientscomprises changing the emphasis coefficients in accordance with a monotone increasing function or a monotone decreasing function corresponding to said standard deviation according to a variation of the gray value of the image.

* * * * *